April 2, 1935.   J. R. G. J. BLANCARD   1,996,609
MEANS FOR PRODUCING A LEVEL EFFECT
Filed March 22, 1932   2 Sheets-Sheet 1

April 2, 1935.                J. R. G. J. BLANCARD                1,996,609
                        MEANS FOR PRODUCING A LEVEL EFFECT
                        Filed March 22, 1932       2 Sheets-Sheet 2
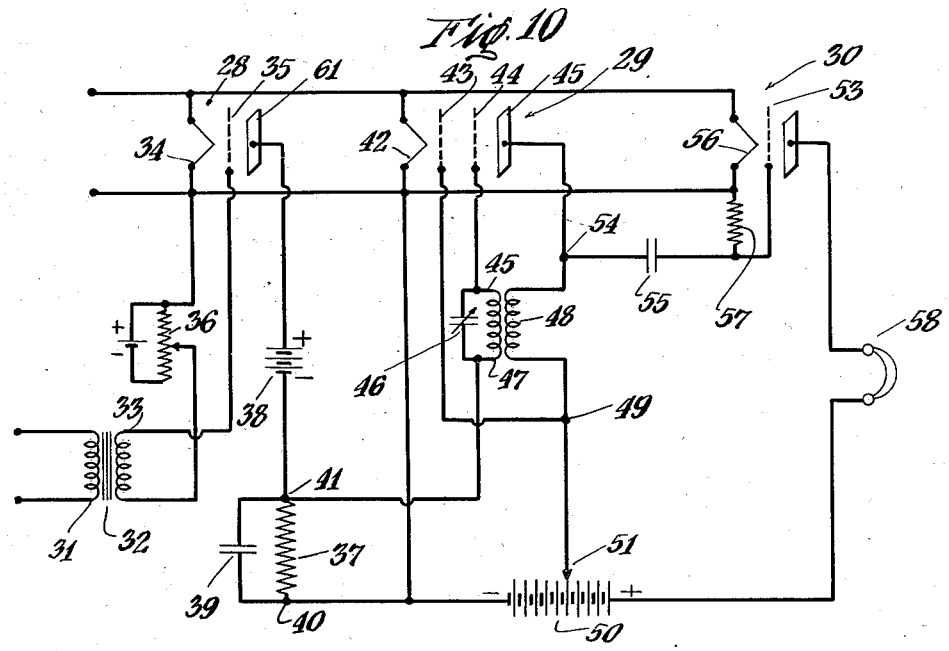
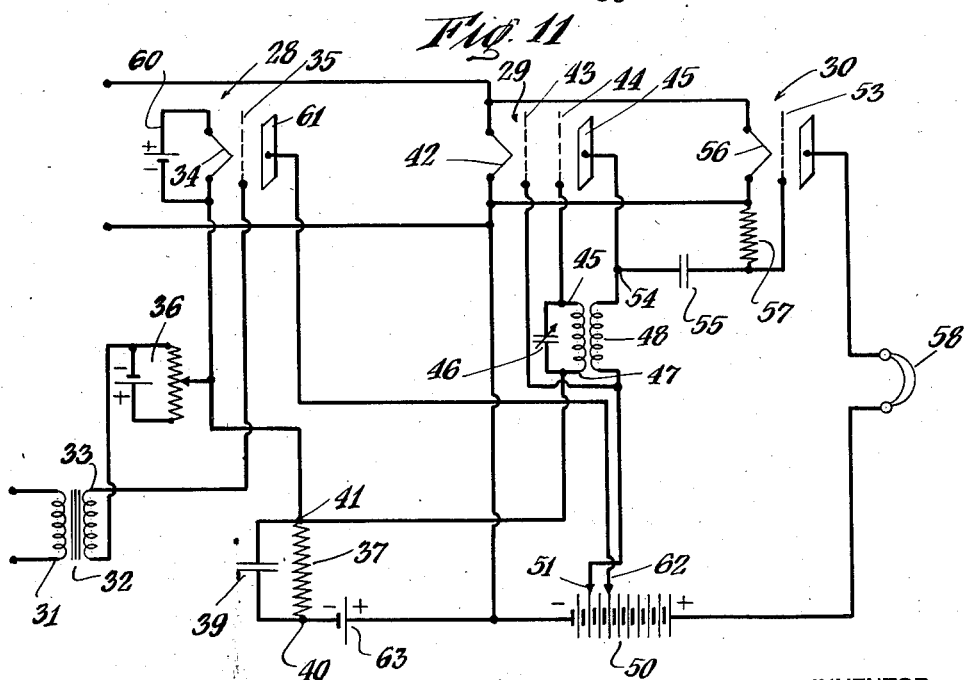

Patented Apr. 2, 1935

1,996,609

UNITED STATES PATENT OFFICE 1,996,609

MEANS FOR PRODUCING A LEVEL EFFECT

Jean Roger Georges Jules Blancard, Meulan, France, assignor to American Loth Corporation, a corporation of New York Application March 22, 1932, Serial No. 600,496
In France March 23, 1931

3 Claims. (Cl. 250—11)

This invention pertains generally to directed electro-magnetic waves and particularly to the reception thereof. The invention pertains more particularly to means whereby the points of maximum and/or minimum intensity may be more accurately defined by the receiving apparatus.

One means of sending directed electro-magnetic waves is by the use of a loop antenna.

This is illustrated in the drawings, in which

Figure 10 is a circuit diagram of one form of the invention.

Figure 11 is a circuit diagram of another form of the invention.

Figure 1:
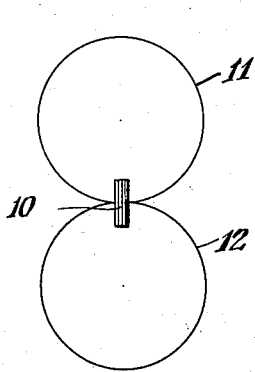
Figure 1 is a theoretical polar diagram in which intensity of radiation is plotted vectorially.

Referring to Figure 1, at 10 is shown a simple loop antenna. The intensity diagram of the radiation field being illustrated by the circles 11 and 12 which pass through the faces of the coil 10 and are tangent to the imaginary line passing through the center of the faces of coil 10.

Figure 2:
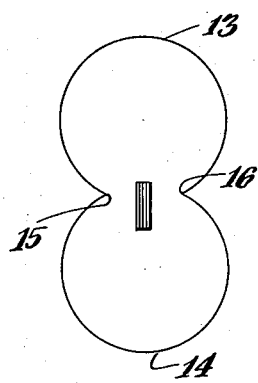
Figure 2 is a practical diagram of such intensity.

In practice it is found that the intensity diagram takes the form shown in Figure 2, the maxima being at 13 and 14 and the minima at 15 and 16.

The diagrams in Figures 1 and 2 also illustrate the strength of signals received from a transmitting station by means of simple loop antenna for azimuth angles from 0° to 360°, such signals being a maximum when the plane of the loop points toward the transmitting station, and being a minimum when such plane is at right angles to said first mentioned position.

By means known in the art, such as a combination of antenna, the intensity diagram may be varied considerably, one well known form being in the shape of a cardioid. The invention herein is adapted for use with any such forms.

In view of the fact that the maxima and minima of the above-mentioned diagrams are not sufficiently sharp for all practical purposes, it becomes desirable to perfect apparatus for the purpose of either receiving the minima or the maxima to the exclusion of the rest of the diagram. This requires apparatus capable of evincing a level or threshold effect, that is, a determination of when the signals are below a certain strength or are above a certain strength. A convenient form of apparatus is one that will produce a resultant signal when the received signals are below a certain strength or will produce a resultant signal when the received signals are above a certain strength.

Figure 3:
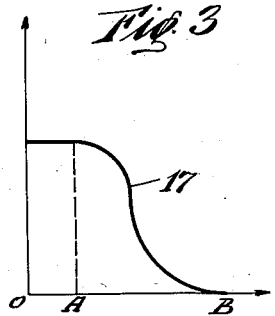
Figures 3, 4, 5 and 6 are curves of operation.

Take the case in which a resultant signal is to be produced when the received signal is below a certain minimum, that is, below a certain strength. This is illustrated in Figure 3 in which the strengths of received signals are plotted as abscissa and the strengths of the resultant signal are plotted as ordinates. The curve 17 indicates a maximum signal when the received signal is between zero and a point which for convenience will be marked A. As the received signal increases the strength of the resultant signal decreases until it is entirely eliminated at a second point marked for convenience B.

Figure 4:
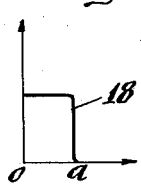

By introducing phenomena of saturation or of limitation, or otherwise, the distance between A and B may be considerably decreased or entirely eliminated to form a curve illustrated diagrammatically at 18 in Figure 4.

Figure 5:
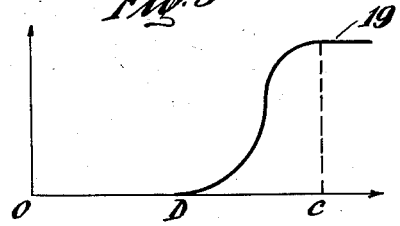

A curve corresponding to operation with received signal strength above a certain minimum strength is illustrated in Figure 5, in which received signals above the value C cause a resultant signal of more or less constant strength but which diminishes in strength as the received signal diminishes below the value C until it is entirely eliminated at a point D. By means above alluded to, the distance between C and D may be substantially eliminated, resulting in a curve somewhat like that shown at 20 in Figure 6.

Figure 7:
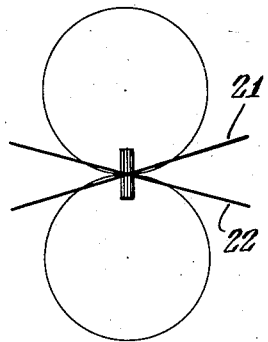
Figures 7 and 8 are diagrams.

In Figure 7 is shown an operation diagram corresponding to the diagram shown in Figure 4, the resultant signal being produced when the strength of the received signal is between the lines 21 and 22.

Figure 6:
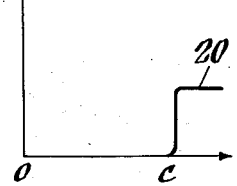
Figure 8:
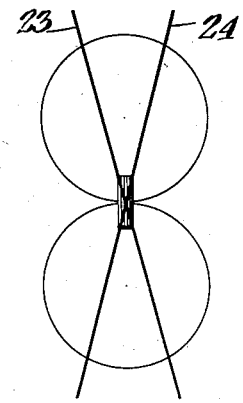

In Figure 8 is shown an operation diagram corresponding to Figure 6, the resultant signal being produced when the strength of the received signal is between the lines 23 and 24.

According to this invention, the above results are obtained by controlling an oscillator circuit by means of the received signal. For instance, the oscillator circuit may be caused to oscillate when the received signal is between zero and a predetermined level of strength, beyond which the oscillations are stopped. A resultant signal controlled by oscillations in the oscillator circuit would thus be produced when the strength of the received signal is between lines 21 and 22 in Figure 7.

On the other hand, the oscillations might be set up after the received signals have exceeded a predetermined level of strength, in which case the resultant signal would be produced between the lines 23 and 24 in Figure 8.

Figure 9:
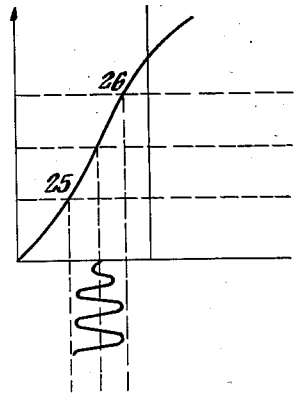
Figure 9 is a conventional grid-voltage plate-current curve.

One means of carrying out the invention is to adjust the oscillator circuit so that it will oscillate only when the oscillator tube is operating on the straight portion of its plate-current grid-voltage curve, a conventional form of which is shown in Figure 9, the straight portion being approximately between the points 25 and 26.

If the bias on the grid of the oscillator tube is such as to bring the bias point below point 25, when no signal is received, no oscillations will take place. Now if the received signal may be caused to impress a positive potential on the grid of the oscillator of sufficient magnitude to bring the bias point between the points 25 and 26, oscillations will obviously take place, such oscillations ceasing only upon a decline in such potential below the required magnitude.

This corresponds to the operation illustrated in Figure 8.

The magnitude of the applied positive potential being a direct function of the received signals, it follows that if this potential becomes sufficiently great, the bias point may be pushed beyond the point 26, whereupon oscillations will cease.

Let us assume now that the oscillator circuit is adjusted so that the bias point is between the points 25 and 26, and the circuit is oscillating when no signal is received. As the received signal increases in strength the bias point is pushed upwardly on the curve and oscillations will cease when the bias point passes beyond the point 26, starting again, of course, when the bias point returns to within points 25 and 26. The latter corresponds to the diagram shown in Figure 7.

Another way of accomplishing the desired results is to have the received signal impress a negative bias on the grid of the oscillator tube. In this instance, to obtain results corresponding to the diagram of Figure 7, the bias point would be between the points 25 and 26 when no signal is received. Then as the strength of the received signal increases the bias point is pushed downwardly on the curve in Figure 9 and the oscillations stop when the bias point passes over the curved portion.

To obtain the results illustrated in Figure 8 the bias point would be adjusted so as to fall above the point 26 when no signal is received. Then as the strength of the received signal increased the bias point would be pushed downwardly to between points 25 and 26, whereupon oscillations would be produced.

A circuit for purposes of impressing a negative potential on the grid of an oscillator of a magnitude proportional to the strength of the received signal is illustrated in Figure 10, in which 28 is a detector tube, 29 an oscillator tube, shown for convenience as of the screen grid type, and 30 is an amplifier or detector tube. The signal is received by primary 31 of transformer 32 from any desired source such as directly from the antenna which may be a rotating loop as above indicated, or more preferable, from a radio-frequency amplifier, or if desired, from an audio-frequency amplifier connected to a radio-frequency amplifier. One end of secondary 33 is connected to filament 34 of tube 28, the other end is connected to grid 35, tube 28. A potentiometer 36 for adjusting the bias on grid 35 may be interposed in the grid-filament circuit if desired. A resistance 37 is connected in the output circuit of tube 28, together with a source of potential shown at 38. A condenser 39 of by-passing dimensions is shown connected across outer points 40 and 41 of resistance 37.

Tube 29 comprises filament 42, screen grid 43, control grid 44, and plate 45. Point 41 is connected to control grid 44 through an oscillatory circuit 45 having a condenser 46 and a coil 47. Coil 47 is coupled to the plate circuit of tube 29 through coil 48. Screen grid 43 is connected to the plate circuit as shown at 49, the grid 43 and plate 45 being connected to the filament 42 through a source of potential 50, made adjustable as indicated at 51.

Grid 53 of tube 30 is connected to point 54 of the plate circuit of tube 29 through condenser 55, and to filament 56 of tube 30 through resistance 57. A translating device 58 is shown in the output circuit of tube 30.

The operation of the form of the invention shown in Figure 10 is as follows: Oscillations are produced by adjusting tap 51 and the coupling between coils 47 and 48 when no signals are received in primary 31. These oscillations are produced in spite of the negative bias on grid 44 produced by the drop across resistance 37 in the plate circuit of tube 28. Tube 28, operating as a detector on the lower portion of its plate-current grid-voltage curve, causes an increase in its plate current upon a flow of current in primary winding 31. This increases the RI drop across resistance 37, which in turn increases the negative bias on grid 44. As the RI drop increases with increase in plate-current, a point is reached beyond which tube 29 will not oscillate, and the signal received at 58 ceases. The signal at 58 does not return until the current in primary winding 31 has decreased to a point where the drop across resistance 37 is not sufficient to prevent oscillation of tube 29.

Let us assume now that the bias on grid 44 is such as to bring the bias point above point 26 on the curve in Figure 9. The tube 29 would not oscillate in this instance until the current received at 31 is of sufficient magnitude to bring the bias point down between points 25 and 26.

The circuit for the purpose of impressing a positive potential on the grid of an oscillator of a magnitude proportional to the strength of the received signal is illustrated in Figure 11. This circuit is in all respects similar to the circuit shown in Figure 10 except that, whereas the point 40 of resistance 37 is still directly connected (in this instance shown through battery 63) to the filament 42, the point 41 is not directly connected to the plate of tube 28 but is directly connected to the filament 34 thereof. The filament 34 is heated from a separate source, shown at 60. Plate 61 of tube 28 is connected directly to the potential source 50 by an adjustable means illustrated at 62.

A "C" battery, illustrated at 63, may be connected as shown for the purpose of placing a negative bias on the grid 44.

The operation of the circuit shown in Figure 11 is as follows: The current flowing normally through resistance 37 causes a positive potential to be applied on the grid 44. As the current in winding 31 increases this positive potential becomes greater in view of the fact that the D. C. component in the output circuit of tube 28 increases with increasing current in the winding 31.

To obtain results as indicated in Figure 7, the circuit would be adjusted to oscillate with no current flowing in the winding 31. Then as the current in winding 31 increased, the bias point would be moved upwardly along the curve shown in Figure 9 and oscillations would eventually stop and would reoccur only upon a decrease of current in winding 31.

To obtain results as illustrated in Figure 8, the circuit would be adjusted so as not to oscillate with no current in winding 31, that is, the bias point would be below point 25 on the curve. Upon increasing the current in winding 31, the bias point would be pushed upwardly on the curve and when between points 25 and 26 the circuit would begin to oscillate. It is of course understood that if the current in winding 31 increased to such an extent as to push the operation above point 26 the circuit would cease to oscillate.

Furthermore, should the signals be of sufficient strength to cause the grid bias to swing positive and thereby cause a substantial grid current, oscillations may be stopped since in Figure 11 the grid current flows through the resistance 37 in a direction opposite to the direct current in the output circuit of the tube 28, thus tending to decrease the effective drop across resistance 37 to a non-oscillating point.

When operating with a screen grid tube at 29 the sensitiveness of the circuit is materially increased in view of the fact that the straight portion of the grid-voltage plate-current curve has a greater slope for a screen grid tube. Therefore it requires only small differences in potential between points 40 and 41 to cause tube 29 to oscillate or cease oscillating or to oscillate with maximum amplitude, thus conforming to the operation illustrated in Figures 4 and 6.

However, it is to be strictly understood that a three-electrode tube might be used in place of the tube illustrated at 29, in which case the screen grid 43 and its connection to the source of potential 50 would be eliminated, the connections otherwise being identical.

The frequency of the oscillations may be controlled by any means known in the art, for instance, by varying the constants at 46, 47 and 48. The condenser 46 may be adjusted to obtain resonance in the oscillatory circuit 45.

Condenser 55, in addition to having blocking functions cooperates with the resistance 57 to place the proper bias on grid 53, so that the tube 30 will operate as an amplifier upon the straight portion of its grid-voltage plate-current curve, or to cause tube 30 to operate as a detector.

The oscillations may be either of audio- or of radio-frequency. If of the audio-frequency, tube 30 or its equivalent merely acts as an amplifier for the purposes of operating translating mechanism shown conventionally as a pair of head receivers 58.

If the oscillations are of radio-frequency it is possible to adjust the frequency thereof so as to produce with the received alternations a heterodyne note in which case the tube 30 or its equivalent would act as a detector.

Inasmuch as the time constant of the oscillatory circuit is a function of the frequency thereof, in the event of rapidly intermittent received signals, it might be necessary to increase the frequency of the oscillatory circuit to in turn decrease its time constant so as to be able to follow the received signals.

It is of course understood that the oscillatory circuit may be employed to control any other circuit, be it an amplifier or detector or otherwise, the amplifier 30 and the head phones 58 being shown merely for the purposes of illustration.

The invention comprises broadly the starting or stopping of oscillations in the oscillatory circuit by means of a change in flow of current in a circuit coupled to the oscillatory circuit, said flow of current being in turn controlled by the strength of the received signals.

The particular description herein is given merely for the purposes of illustration and without any intention of limiting the invention to the particular form shown, nor to the uses set forth.

Having described the invention, it is obvious that many modifications may be made in the same within the scope of the claims without departing from the spirit thereof.

I claim:

1. Apparatus for determining the maxima or minima of reception of electromagnetic waves, comprising in combination, a vacuum tube detector, an antenna for receiving said waves coupled to the input of said detector, a resistance connected in the output circuit of said detector in such a manner that the plate current from said detector flowing through said resistance produces a potential drop thereacross proportional to the strength of the signals impressed upon the input of said detector, a tetrode vacuum tube oscillator comprising a cathode and a control grid, an oscillation circuit comprising a tuning condenser and a coil connected in parallel, said oscillation circuit being connected in series between one side of said resistance and the control grid of said tetrode vacuum tube oscillator, the other side of said resistance being connected to the cathode of said oscillator whereby the potential drop across said resistance is impressed upon the control grid of said vacuum tube oscillator to control the oscillations therein, and means for indicating the generation of oscillations by said oscillator, whereby a resultant signal is produced bearing a definite desired relation to the reception of signals by said antenna.

2. Apparatus for the reception of electromagnetic waves comprising a triode vacuum tube detector, an antenna circuit connected to the input of said detector, a tetrode vacuum tube oscillation generator having a cathode, an oscillation control grid, a plate, and a positively biased screen grid located between said cathode and said control grid for preventing any back radiation of oscillations into said detector, circuit means for connecting the output of said detector to the input of said oscillation generator whereby the oscillations of said generator are controlled in accordance with the signals received in said antenna circuit, and translating means for audibly interpreting said controlled oscillations.

3. Apparatus for the directional reception of electromagnetic waves comprising in combination a directional antenna system, a triode vacuum tube detector having its input connected to said antenna system, a tetrode vacuum tube oscillation generator having a cathode, an anode, a positively biased screen positioned next to said cathode and electrically connected to said anode circuit so that it operates at the same potential as said anode and prevents feed back of oscillations into said detector circuit, a control grid positioned between said screen grid and said anode for controlling the oscillations in said oscillation generator tube, a circuit connecting the output of said detector tube to the input of said oscillator tube, said circuit including a resistance one side of which is connected to the control grid of said oscillator and the other side connected to the cathode of said oscillator, whereby the potential drop across said resistance caused by the plate current of said detector tube flowing through said resistance is impressed upon the control grid of said oscillator, a triode vacuum tube connected to the output of said oscillation generator for amplifying the output thereof, and translating means connected to the output of said amplifier for indicating said amplified oscillations.

JEAN ROGER GEORGES JULES BLANCARD.